(12) United States Patent
Sait et al.

(10) Patent No.: US 12,108,697 B1
(45) Date of Patent: Oct. 8, 2024

(54) AGRICULTURAL MANAGEMENT SYSTEM USING A DEEP LEARNING-BASE FRAMEWORK

(71) Applicant: KING FAISAL UNIVERSITY, Al-Ahsa (SA)

(72) Inventors: Abdul Rahaman Wahab Sait, Al-Ahsa (SA); Ashit Kumar Dutta, Al-Ahsa (SA); Shtwai Alsubai, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/220,035

(22) Filed: Jul. 10, 2023

(51) Int. Cl.
| | | |
|---|---|---|
| *A01B 79/00* | (2006.01) | |
| *A01B 79/02* | (2006.01) | |
| *G16Y 10/05* | (2020.01) | |
| *G16Y 20/10* | (2020.01) | |
| *G16Y 40/10* | (2020.01) | |
| *G16Y 40/20* | (2020.01) | |

(52) U.S. Cl.
CPC ............ *A01B 79/005* (2013.01); *A01B 79/02* (2013.01); *G16Y 10/05* (2020.01); *G16Y 20/10* (2020.01); *G16Y 40/10* (2020.01); *G16Y 40/20* (2020.01)

(58) Field of Classification Search
CPC ...... A01B 79/005; A01B 79/02; G16Y 20/10; G16Y 40/10; G16Y 40/20; G16Y 10/05
USPC .......................................................... 702/2
See application file for complete search history.

(56) References Cited

U.S. PATENT DOCUMENTS

| | | | |
|---|---|---|---|
| 11,195,015 B2 | 12/2021 | Tran et al. | |
| 11,521,381 B2 | 12/2022 | Tran et al. | |
| 2017/0015416 A1* | 1/2017 | O'Connor | A01B 79/005 |
| 2021/0019878 A1* | 1/2021 | Iizawa | G06V 20/00 |
| 2021/0029866 A1* | 2/2021 | Placella | G06N 20/20 |
| 2021/0316060 A1* | 10/2021 | Liu | A61M 1/84 |
| 2021/0350128 A1* | 11/2021 | O'Brien | G01W 1/10 |
| 2021/0406539 A1* | 12/2021 | Lo | G06V 20/188 |
| 2023/0119310 A1* | 4/2023 | Long | B64C 39/024 |
| | | | 701/3 |
| 2023/0360389 A1* | 11/2023 | Tiballi | G06V 20/194 |

FOREIGN PATENT DOCUMENTS

| | | | |
|---|---|---|---|
| CN | 113570192 A | * | 10/2021 |
| CN | 215217665 U | * | 12/2021 |
| EP | 3979193 | * | 4/2022 |

(Continued)

OTHER PUBLICATIONS

English translation of KR20190139381, Dec. 2019. (Year: 2019).*

(Continued)

*Primary Examiner* — Michael P Nghiem
(74) *Attorney, Agent, or Firm* — Nath, Goldberg & Meyer; Joshua B. Goldberg

(57) ABSTRACT

An agricultural management system includes an array of IoT sensors located across an area, and a set of wireless portal devices located across the area. The wireless portal devices are in communication with the IoT sensors. A drone, which includes an imaging device, is in communication with the wireless portal devices. A monitoring device gathers and analyzes information from the wireless portal devices using generative adversarial networks (GANs). The monitoring device communicates results of the analysis to an agricultural resource such as the drone to improve productivity.

6 Claims, 16 Drawing Sheets

(56) References Cited

FOREIGN PATENT DOCUMENTS

| | | | |
|---|---|---|---|
| IN | 202141039835 A | | 9/2012 |
| IN | 202211044300 A | | 8/2022 |
| IN | 202241049034 A1 | | 9/2022 |
| KR | 20190139381 A | * | 12/2019 |
| KR | 102530862 B1 | * | 5/2023 |
| WO | 2022040192 A1 | | 2/2022 |

OTHER PUBLICATIONS

English translation of CN113570192, Oct. 2021. (Year: 2021).*
Altalak et al., Smart Agriculture Applications Using Deep Learning Technologies: A Survey, Jun. 2022. (Year: 2022).*
English translation of CN 215217665, Dec. 17, 2021. (Year: 2021).*
English translation of KR 10-2530862, May 4, 2023. (Year: 2023).*
"Smart Agriculture Applications Using Deep Learning Technologies: A Survey" by Maha Altalak, Mohammad Ammad Uddin, Amal Alajmi and Alwaseemah Rizg, Published: Jun. 10, 2022.

* cited by examiner

AGRICULTURAL MANAGEMENT SYSTEM USING A DEEP LEARNING-BASE FRAMEWORK

BACKGROUND

1. Field

The present disclosure relates to practical techniques to monitor crops and support farmers in improving productivity.

2. Description of the Related Art

In general, existing intelligent farming frameworks offer practical techniques to monitor crops and support farmers in improving productivity. These systems provide basic feedback on the status of crops. Farmers must then analyze the data sets and determine how to proceed. This requires many man hours in analyzing data, planning how to improve productivity and finally executing the plan. When crops are located in remote locations or are vast in size, it is difficult to actually see what is actually happening to the crops, which makes it difficult to determine how to improve productivity.

The lack of data, such as image datasets, limited access to agricultural fields in remote locations, substantial computational resources, and narrow AI techniques are the common factors that minimize the performance of smart farming techniques.

SUMMARY

A system for managing agricultural resources that overcomes the aforementioned deficiencies is needed. The system of the present disclosure can include a wireless sensor and Internet of Things (IoT) devices with drones for collecting images of crops. The wireless sensor module contains data from the farm and feeds it as a plain text file. The data pre-process module refines and transforms the data. The framework employs fast-region generative adversarial networks (GANs) for identifying healthy and unhealthy crops. Using the farm's current demographic and historical data, the analysis program performs several computations on the collected data and produces results. A client-side software application on a mobile device displays and transmits data to an analytical web service hosted by a cloud computing-based software application. Depending on the user's preference, the computation and monitoring procedures are repeated daily or hourly. The framework enables farmers to gain information through a mobile device application. Furthermore, the framework stores the data in a private and secure cloud-based storage system, allowing verified users to access it at anytime and from any location. Researchers can access the features to develop new applications.

An agricultural management system, in one embodiment of the present disclosure, includes an array of IoT sensors located across an area, and a set of wireless portal devices located across the area being in communication with the IoT sensors. A drone, which includes an imaging device, is in communication with the wireless portal devices. A monitoring device gathers and analyzes information from the wireless portal devices using generative adversarial networks (GANs). The monitoring device communicates results of the analysis to an agricultural resource such as the drone.

The monitoring device predicts outcomes of agricultural activities on the area and provides solutions to improve productivity.

The monitoring device also identifies healthy and unhealthy crops in the area.

The system can further include a sprayer located on the drone to spray water and fertilizers.

The system can also include a user head mounted device that is in communication with the monitoring device, which allows the user to virtually visit the area through the use of the camera on the drone.

The monitoring device can further include a controller to turn on or off irrigation to the area based on the results of the analysis by the monitoring device.

A method for operating an agricultural managements system includes: obtaining data from an array of IoT sensors located across an area and a drone having an imaging device; communicating the data to a set of wireless portal devices located across the area; gathering and analyzing the data from the wireless portal devices through a monitoring device using GANs; and communicating results of the analysis by the monitoring device to an agricultural resource such as the drone.

The method further includes predicting outcomes of agricultural activities on the area and providing solutions to improve productivity through the monitoring device.

The method also includes identifying healthy and unhealthy crops through the monitoring device.

The method additionally includes spraying water and fertilizers with a sprayer located on the drone.

The method also provides a virtual tour of the area to a user through a head mounted device in communication with the monitoring device and the camera on the drone.

The method additionally includes turning on or off irrigation to the area through a controller based on the results of the analysis by the monitoring device.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Intelligent farming frameworks offer practical techniques to monitor crops and support farmers in improving productivity. The use of image datasets, drones to access agricultural fields in remote locations, substantial computational resources, and artificial intelligence (AI) techniques can foster growth and performance in smart farming techniques. Image processing convolutional neural network (CNN) techniques can be used to enable researchers to build generalized artificial intelligence based applications to govern agricultural resources and monitor farms and agrarian fields effectively.

A system for managing agricultural resources using a deep learning based framework improves productivity. The system for managing agricultural resources includes a wireless sensor having a wireless sensor module and Internet of Things (IoT) devices in combination with drones for collecting images of crops. The wireless sensor module contains data from the farm and feeds such data as a plain text file. The data pre-process module refines and transforms the data. The framework employs fast-region generative adversarial networks (GANs) for identifying healthy and unhealthy crops. Using the farm's current demographic and historical data, the analysis program performs several computations on the collected data and produces results. A client-side software application on a mobile device displays and transmits data to an analytical web service hosted by a cloud computing-based software application. Depending on the user's preference, the computation and monitoring procedures are repeated daily or hourly. The framework enables farmers to gain information through a mobile device application. Furthermore, the framework stores the data in a private and secure cloud-based storage system, allowing verified users to access it at anytime and from any location. Researchers can access the features to develop new applications.

In one non-limiting embodiment, a framework for managing agricultural resources and fields uses deep learning (DL) techniques. The framework includes a data acquisition communication network based on wireless devices, smart irrigation, drone-based remote area management, resource management, and virtual reality (VR) monitoring models.

Figure 1:
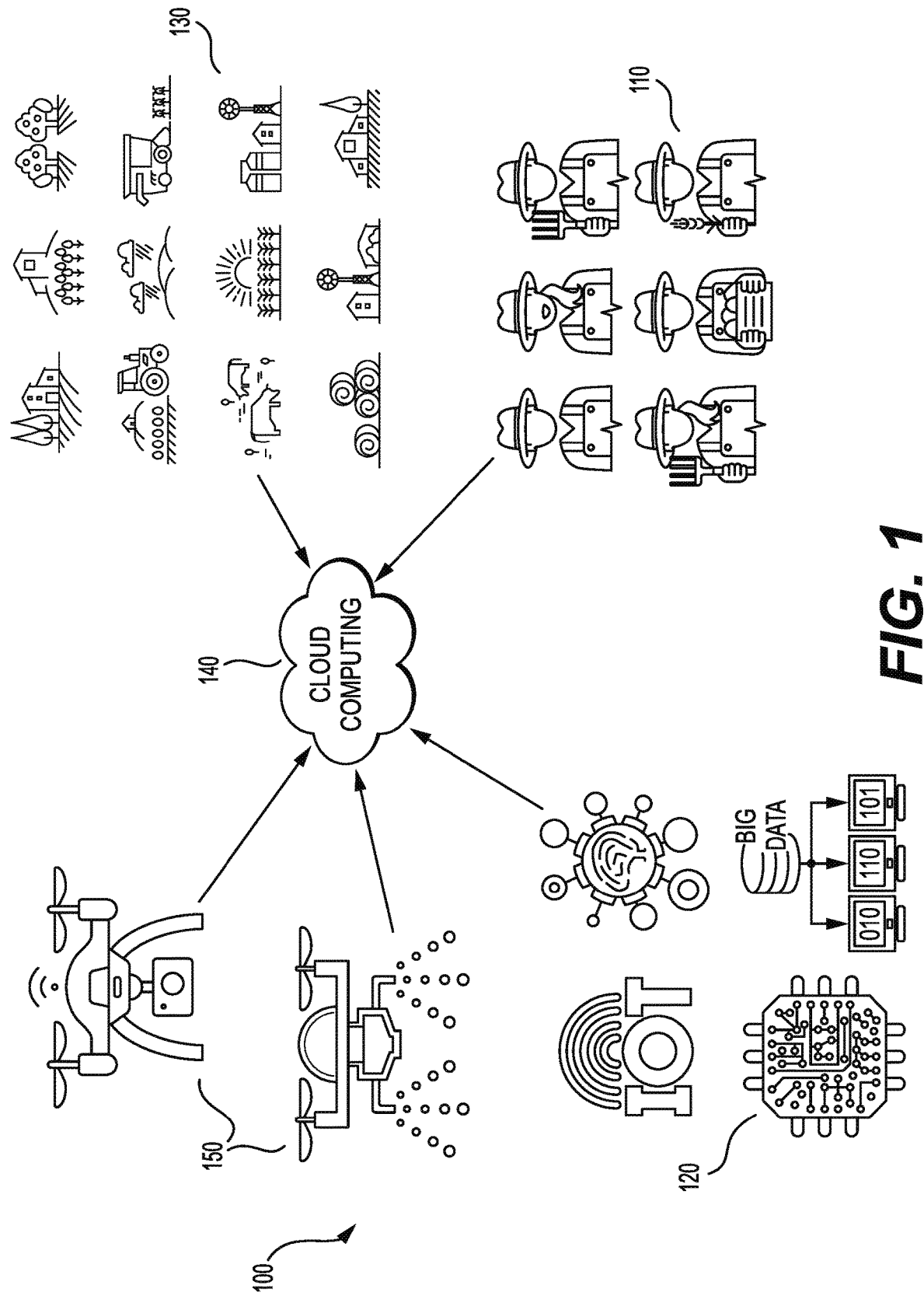
FIG. 1 is an illustration of a DL framework for managing agricultural resources.

FIG. 1 is an illustration of a DL framework for managing agricultural resources. The framework 100 facilitates the users 110 to handle IoT devices 120 and manage the agricultural resources 130 through cloud computing (CC) infrastructure 140. In contrast, edge computing (EC) is used for communication between the IoT devices 120. EC offers an effective environment for IoT device communication. Moreover, the framework minimizes human interaction for collecting and processing data in remote locations. Developers can set the parameters of drones 150 using GPS data. Drones 150 include at least one drone and are employed to interact with the IoT and wireless devices 120 to collect data through the remote location's wi-fi or internet towers. In addition, drones 150 may be used to capture images of crops, plants, leaves, and the structure of the field. The present subject matter is directed to the use of at least one drone in the inventive systems, but multiple drones can be employed.

Figure 2:
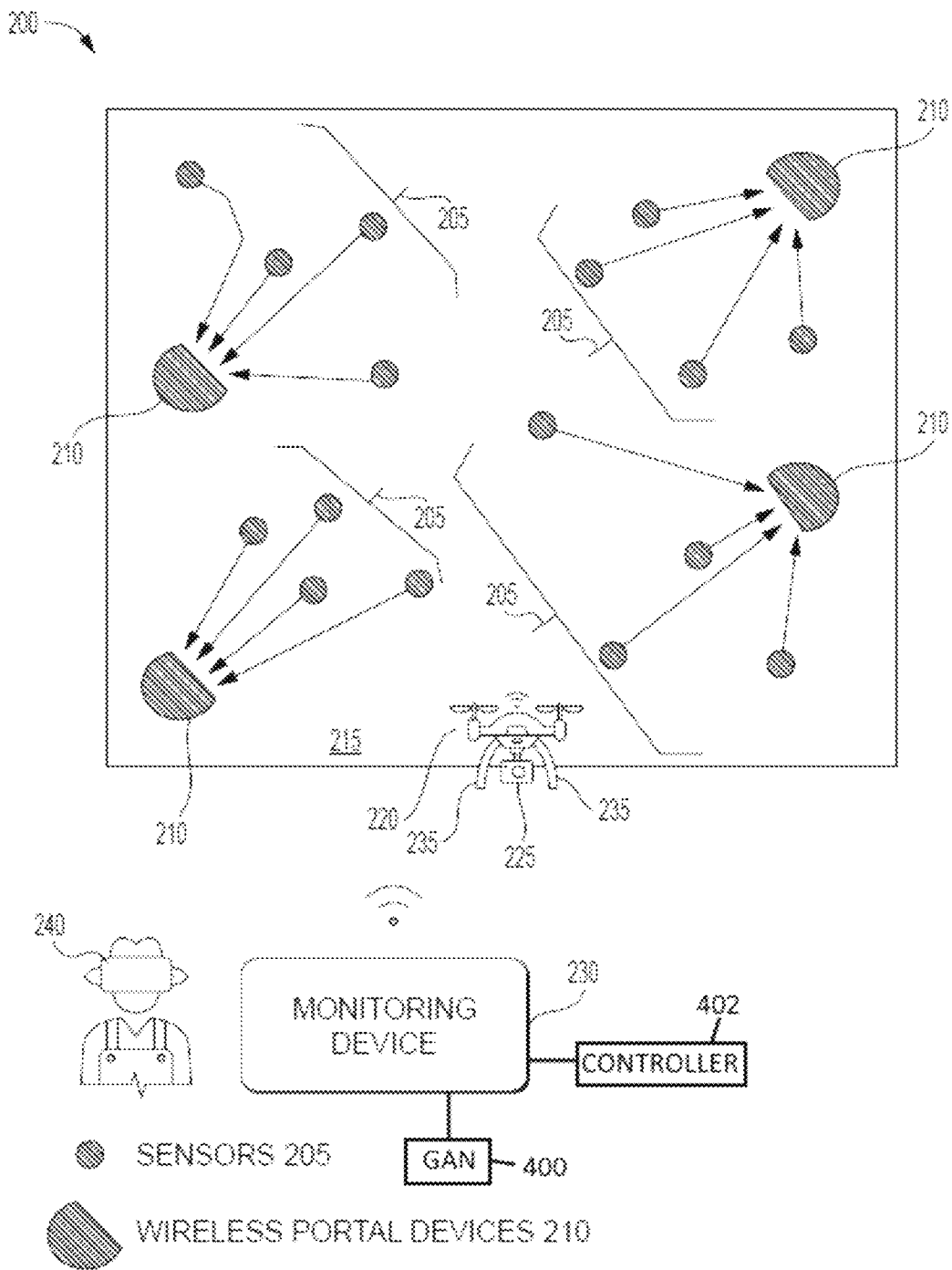
FIG. 2 is an illustration of an agricultural management system.

FIG. 2 is an illustration of an agricultural management system 200. It includes four arrays of IoT sensors 205 and a set of wireless portal devices 210 located across the area 215. The set of wireless portal devices 210 are in communication with the IoT sensors 205. At least one drone 220, which includes an imaging device 225, is in communication with the wireless portal devices 210. A monitoring device 230 gathers and analyzes information from the wireless portal devices using generative adversarial networks (GANs) 400. The monitoring device 230 communicates results of the analysis to an agricultural resource such as the drone 220.

The monitoring device 230 predicts outcomes of agricultural activities on the area 215 and provides solutions to improve productivity using deep learning techniques.

The monitoring device 230 also identifies healthy and unhealthy crops in the area 215 using fast-region generative adversarial networks.

The system 200 can further include a sprayer 235 located on the drone 220 to spray water and fertilizers.

The system 200 can also include a user head mounted device 240 that is in communication with the monitoring device 230, which allows a user to virtually visit the area 215 through the use of the camera 225 on the drone 220.

The monitoring device 230 can further include a controller 402 to turn on or off irrigation to the area 215 based on the results of the analysis by the monitoring device 230.

The communications network uses wireless sensors and IoT devices in remote locations to reduce the chances of wildfire. In addition, the system 200 can assist farmers in understanding the problems of specific crops or plants. A client-side software application provides detailed information to help farmers improve their productivity.

The agricultural management system 200 includes smart farming family techniques. It is also used to manage agricultural resources and irrigation methods. It optimizes existing farming techniques by applying deep learning techniques.

The following procedures are applied for implementing the proposed framework.

Step 1: Installing IoT sensors, wireless portal devices, and configuring drones by setting the latitudes and longitudes of the farms. In this step, an array of IoT sensors are planted across the farms. A set of wireless portal devices are fixed at a range having a 10-meter radius. The drones are configured to interact with the IoT sensors using wireless portal devices. In addition, a sprayer is connected to drones for spraying water and fertilizers. IoT sensors pass adequate soil information to the server using the wireless portal device.

Step 2: Configuring the fast-region GANs-based application for identifying healthy and unhealthy crops. In this step, the images of leaves, plants, and crops in the farms are used to train the deep learning-based application.

Step 3: Storing the data of the agricultural resources of the specific farms.

Step 4: Configuring the server- and client-side application for predicting the outcomes of the present agricultural activities and providing a solution to improve productivity.

Step 5: The user's mobile devices are connected to the application in order to receive communication regarding their farm processes.

1. Data Acquisition

Figure 3:
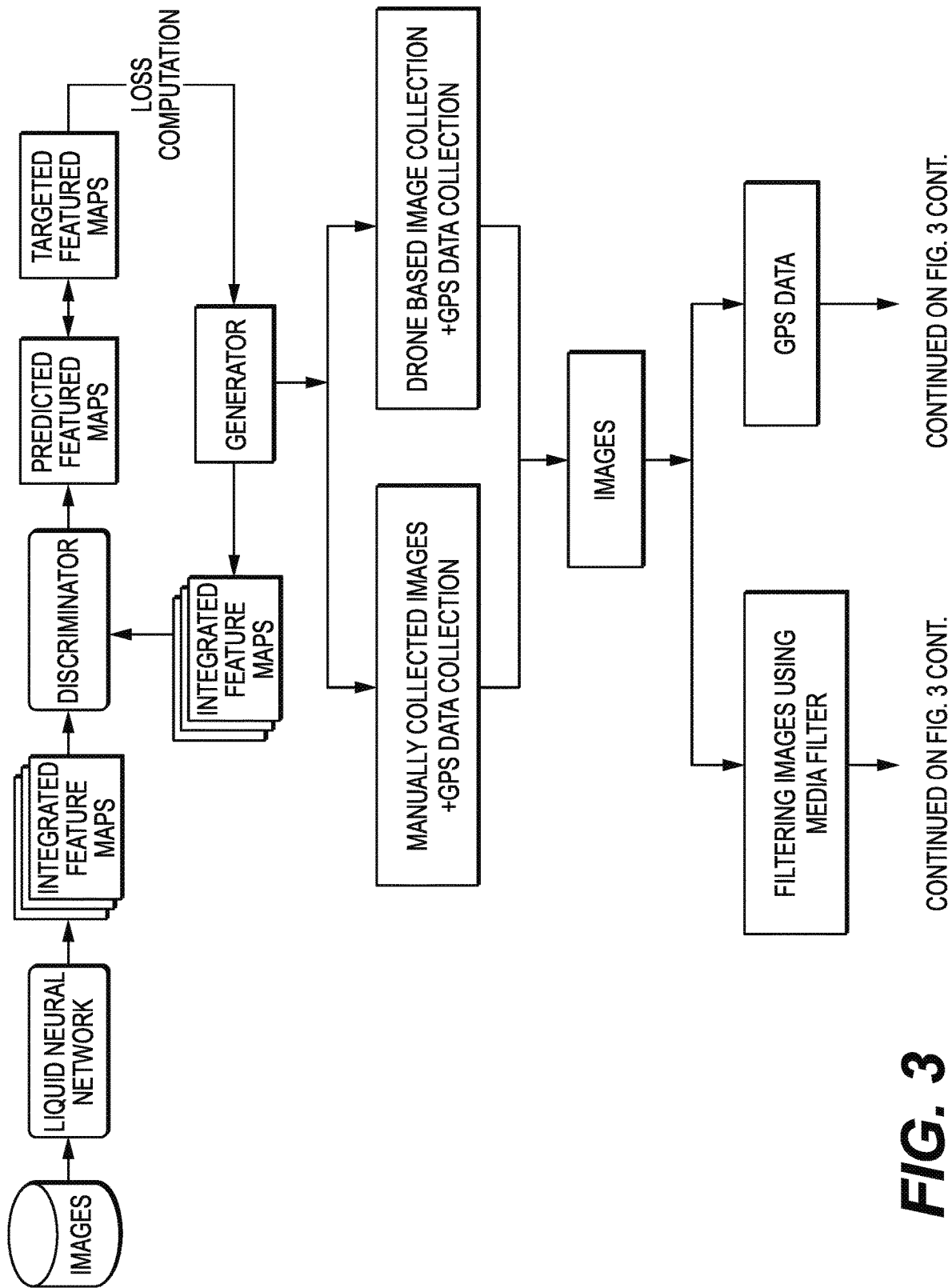
FIG. 3 is an illustration of the data acquisition process.
Figure 3:
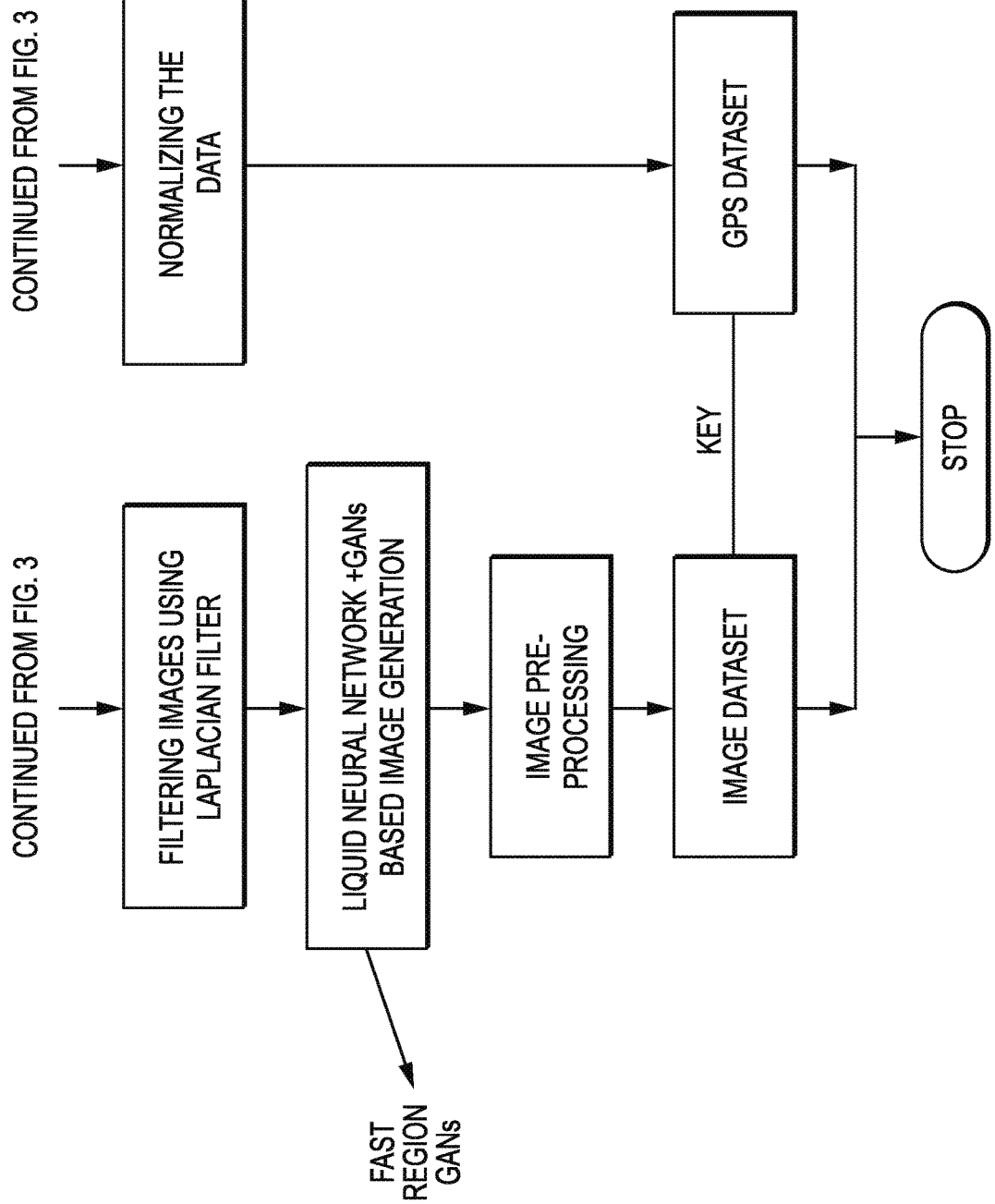

FIG. 3 is an illustration of the data acquisition process. This phase includes cameras, drones, a set of individuals for collecting images of crops, trees, coffee beans, etc., image repositories, and software applications. These elements play a significant role in the embodiment. Initially, a workforce is required to capture images of the crops, weeds, etc., as well as other data regarding the respective farmland. In addition, drones with cameras are employed to collect multi-dimensional images.

Furthermore, the images are pre-processed using median and laplacian filters in order to overcome image noise. On the other hand, the GPS data of the images are normalized using the minmax scaler function for calculating the distance between the images. A key is annotated with each image and GPS data.

Figure 4:
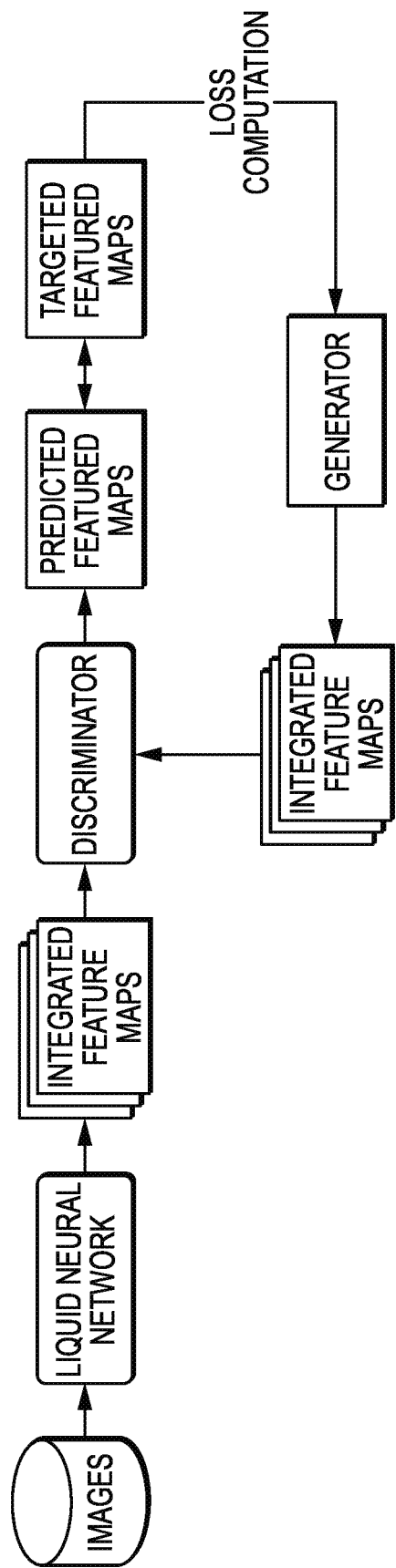
FIG. 4 is an illustration of a liquid neural network process.

Fast region GANs are developed using liquid neural networks and GANs, as shown in FIG. 4. Liquid neural networks process the images and extract features through a test and generating manner. Using this approach, a set of features called feature maps are generated. The feature maps are generated as a single image and forwarded to the generator and discriminator units. Finally, the images and GPS data are stored in the repositories for training the AI-based image processing and machine learning (ML) techniques, respectively.

2. Wireless Communication

Figure 5:
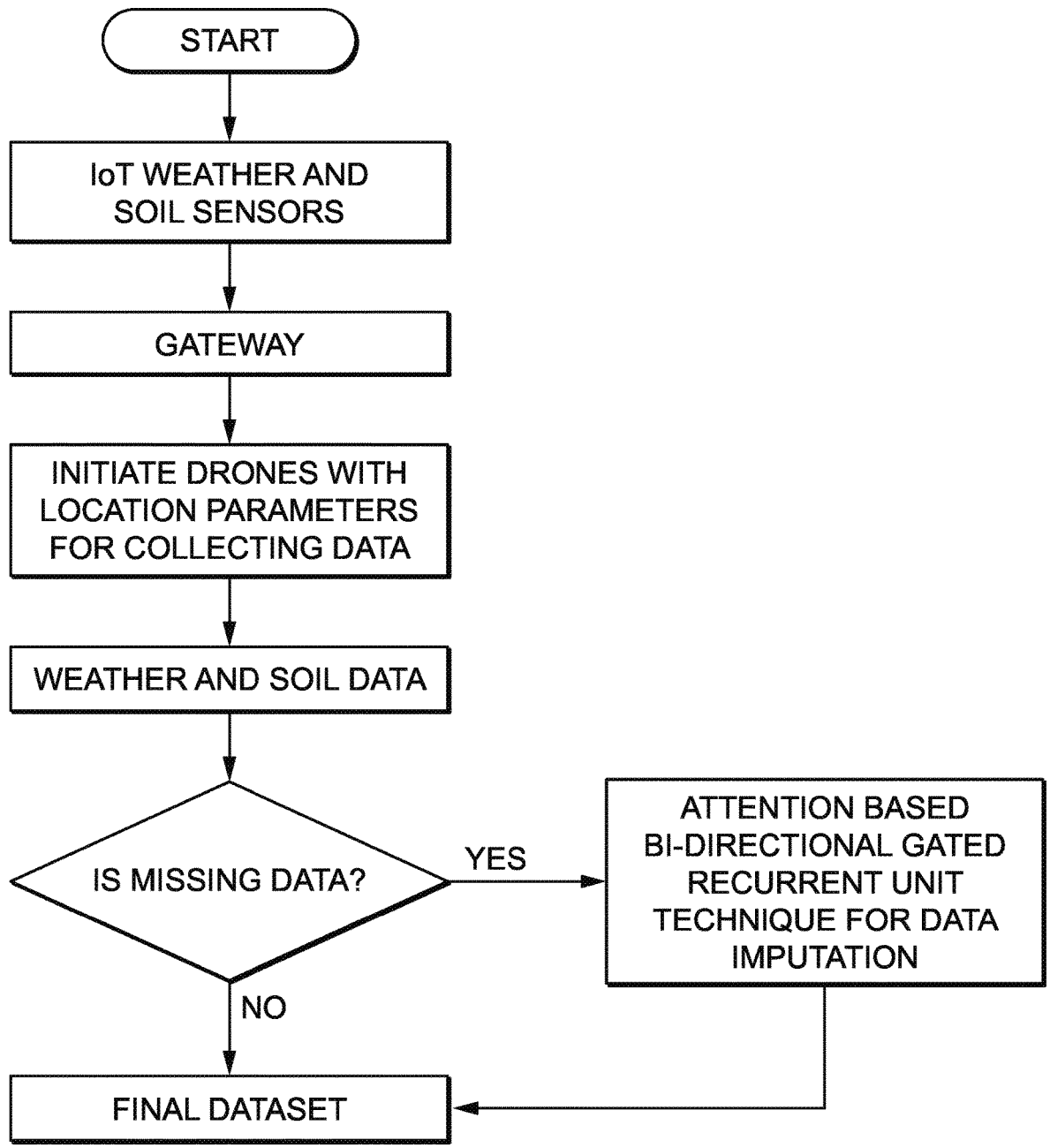
FIG. 5 is a flow diagram of wireless communication among the Internet of Things (IoT) sensors and devices.

FIG. 5 presents wireless communication among the Internet of Things (IoT) sensors and devices. IoT devices rely heavily on wireless communication as one of its primary modes of inter-device interaction. Radio waves send data from one device to another in this network. Wi-Fi, Bluetooth, and Zigbee are used for wireless communication technologies. Bluetooth handles short-range wireless communication, whereas Zigbee is utilized for low-power, low-bandwidth tasks.

The use of network protocols facilitates the transmission of data between nodes in a network. TCP/IP, HTTP, and MQTT are used as network protocols. TCP/IP is the most common protocol, utilized in smartphones and computers. Web apps employ HTTP, whereas low-power, low-bandwidth applications use MQTT. With EC, IoT devices communicate with each other independently. Information is sent from one device to another through EC. As an alternative to processing data in the cloud or a remote data center, edge computing shifts application workloads to edge servers (also called nodes) to process the data near where it is gathered and where action must be done. Processing data locally provides analytical conclusions and the capacity to initiate an instant reaction quickly. To better manage the resources, clients may benefit from having decision-making and control algorithms run closer to the edge sensors. And edge computing offers new opportunities for Internet of Things applications in locations with low network availability.

The crop's environment, including humidity, air temperature, wind speed, sunlight radiation, and soil moisture management, may now be monitored and evaluated with the help of an additional IoT-based weather monitoring system. It makes use of weather-based sensors that are connected to a wireless network in order to relay data in real-time. Using this technology makes it possible to collect extensive weather data, which may be used in designing tools to bolster the irrigation process.

In contrast to the central cloud data centers, the devices, sensors, and telecommunications equipment installed at the far edge are located closest to the end users. The safety of Internet of Things (IoT) devices is a significant concern. In order to keep information safe, this kind of interaction relies on authentication and encryption mechanisms. Transport Layer Security (TLS) and Secure Sockets Layer (SSL) are used for this purpose. Data transmission between devices may be encrypted using these protocols.

Figure 6:
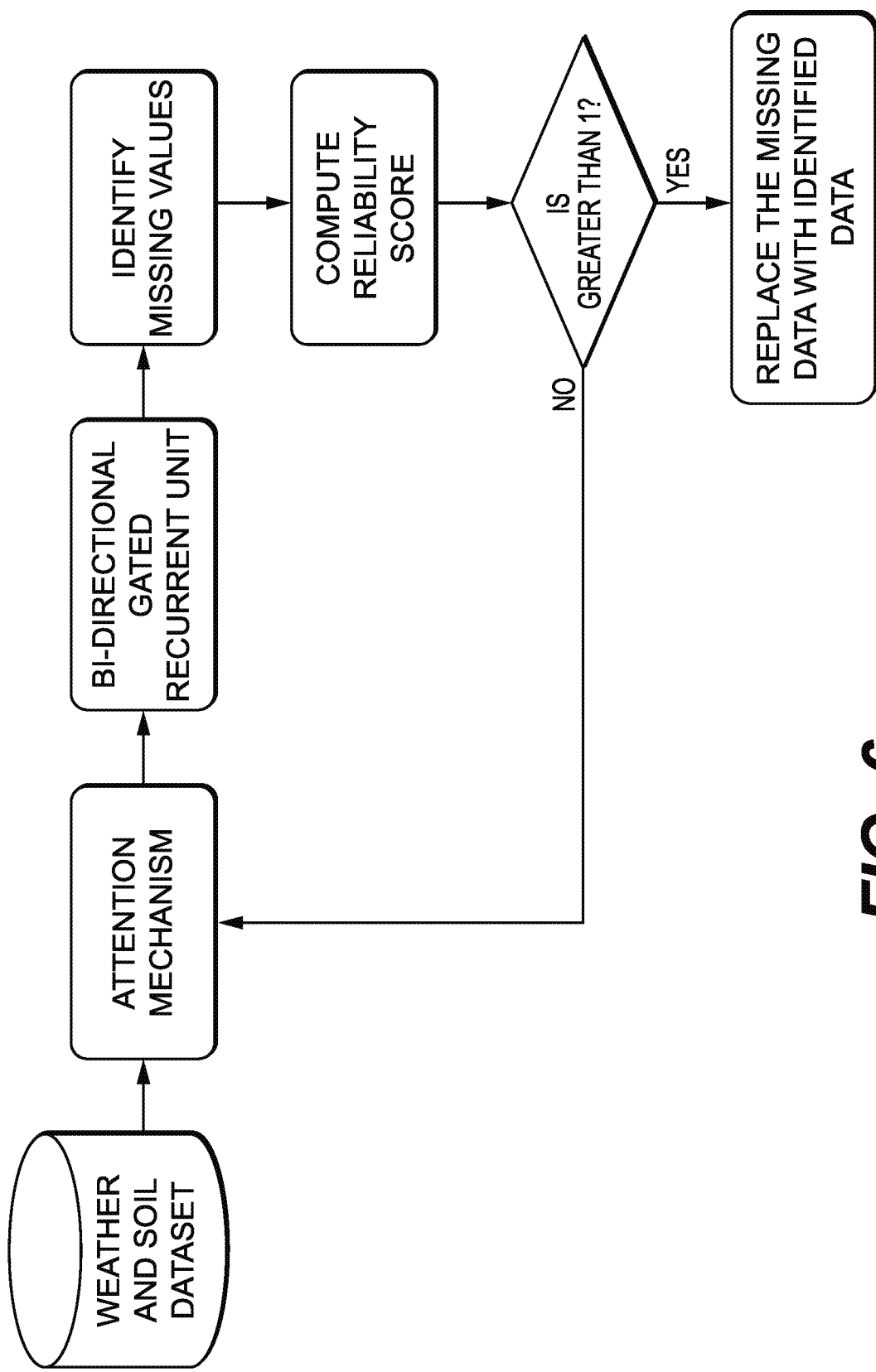
FIG. 6. Is an illustration of a BI-GRU missing value computation process.

Drones are launched to collect data from IoT devices by connecting the IoT gateways through the cellular towers. Furthermore, the missing data is one factor that reduces the performance of ML-based approaches. In order to address the missing data, the attention mechanism-based Bi-directional Gated Recurrent Unit (A-BI-GRU) is developed, as shown in FIG. 6. Initially, the attention mechanism identifies the missing data from the dataset. BI-GRU is used to compute the missing value. A reliability score is used to ensure the accuracy of the missing data.

3. Smart Irrigation

In order to maximize food production while minimizing water waste, it is essential to build an efficient irrigation management system that includes reliable monitoring of plant growth and development. With the IoT and Wireless Sensor Networks (WSN), monitoring in the context of precision irrigation entails gathering data that accurately reflects the current state of the plants, soil, and weather in irrigation regions. As a result of IoT device data, a low-cost technological approach has been established, which improves the control and monitoring system for the irrigation process and allows for real-time data collection. WSN also makes important contributions to real-time monitoring for precision agriculture. This method uses a system of wireless sensor nodes and IoT devices to collect, process, and transmit data on various variables.

Figure 7:
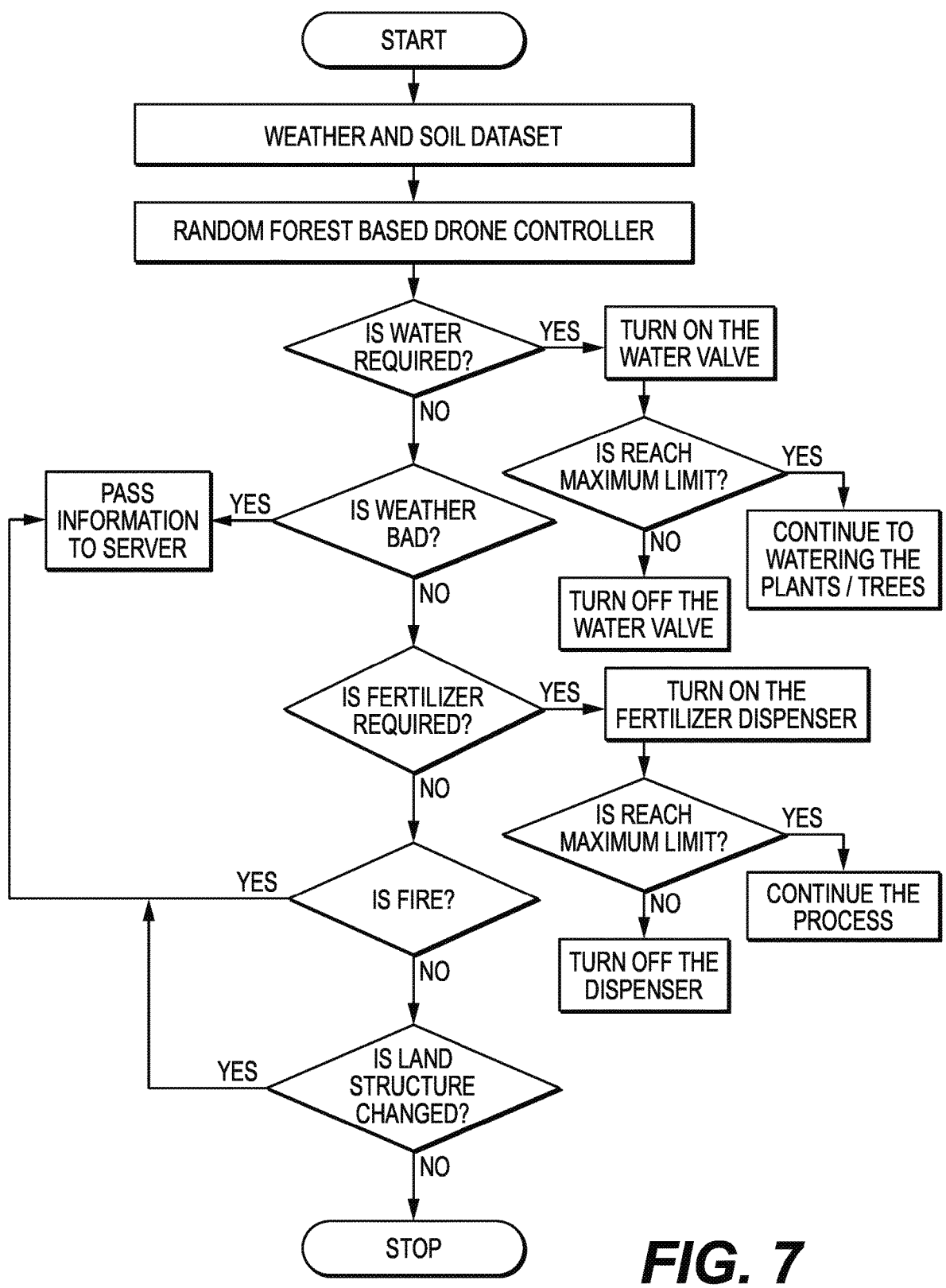
FIG. 7 is an illustration of an intelligent irrigation process.
Figure 8:
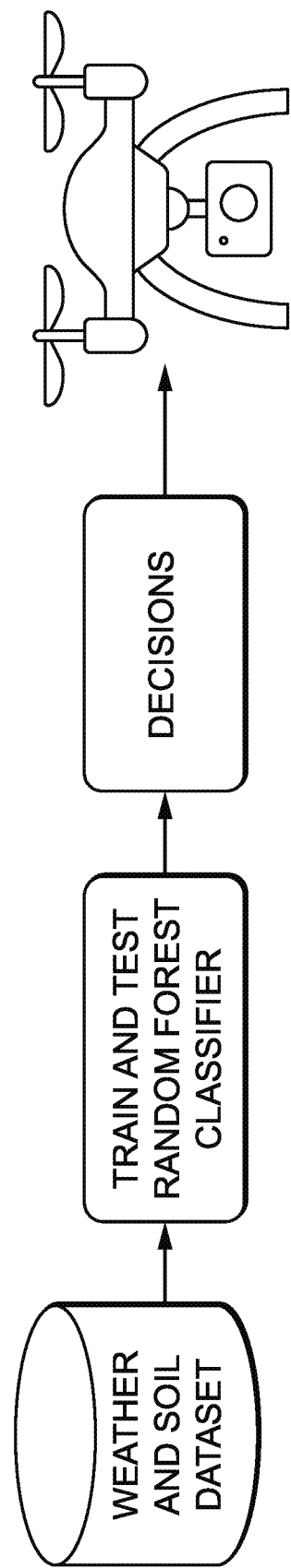
FIG. 8 is an illustration of an RF classifier decisions process.

FIG. 7 represents the proposed intelligent irrigation system. Based on the dataset, a Random Forest (RF) classifier is developed to control drones for smart farming processes. When a drone enters a specific location, it collects data and forwards it to the server. The real-time data is fed into the RF classifier, as shown in FIG. 8. The classifier makes decisions and controls the drone to monitor the location. The drone operates the IoT devices and performs the necessary tasks. For instance, soil moisture sensing devices employ a dielectric primary operating principle-capacitance. The purpose of soil monitoring is to determine the soil's water status using the smart irrigation system's well-based technology. Planting soil moisture sensors at the base of trees, shrubs, or turf allows for accurate soil moisture measurement and subsequent data transmission to a controller. This approach ensures that the necessary data is preserved to support the associated tasks most effectively. The drone recognizes the limitations of the necessary locations in the remote area and passes the information to the server. Using the heat sensing IoT devices, it identifies wildfires. In addition, the structural land images are used by the drone to identify changes in real-time. The processes are explained in the following section under remote monitoring system.

Suspended cycle irrigation and water-on-demand irrigation are two primary technologies that use soil moisture sensors. Similar to a conventional watering timer, a suspended cycle specifies when watering should begin and terminate based on data. The key distinction is that the device will cancel the following round of planned irrigation when the soil has absorbed enough water. However, water-on-demand irrigation may be set up without planning or considering how long it would run. This method relies on a user-set threshold to initiate irrigation when soil moisture falls below a certain level. Similarly, a fertilizer dispenser is used to release the fertilizer to specific crops based on the requirement. It reduces fertilizer consumption and reduces chemical interaction with the crops. In addition, a focused fertilizing process is possible through the proposed system.

4. Remote Monitoring

Figure 9:
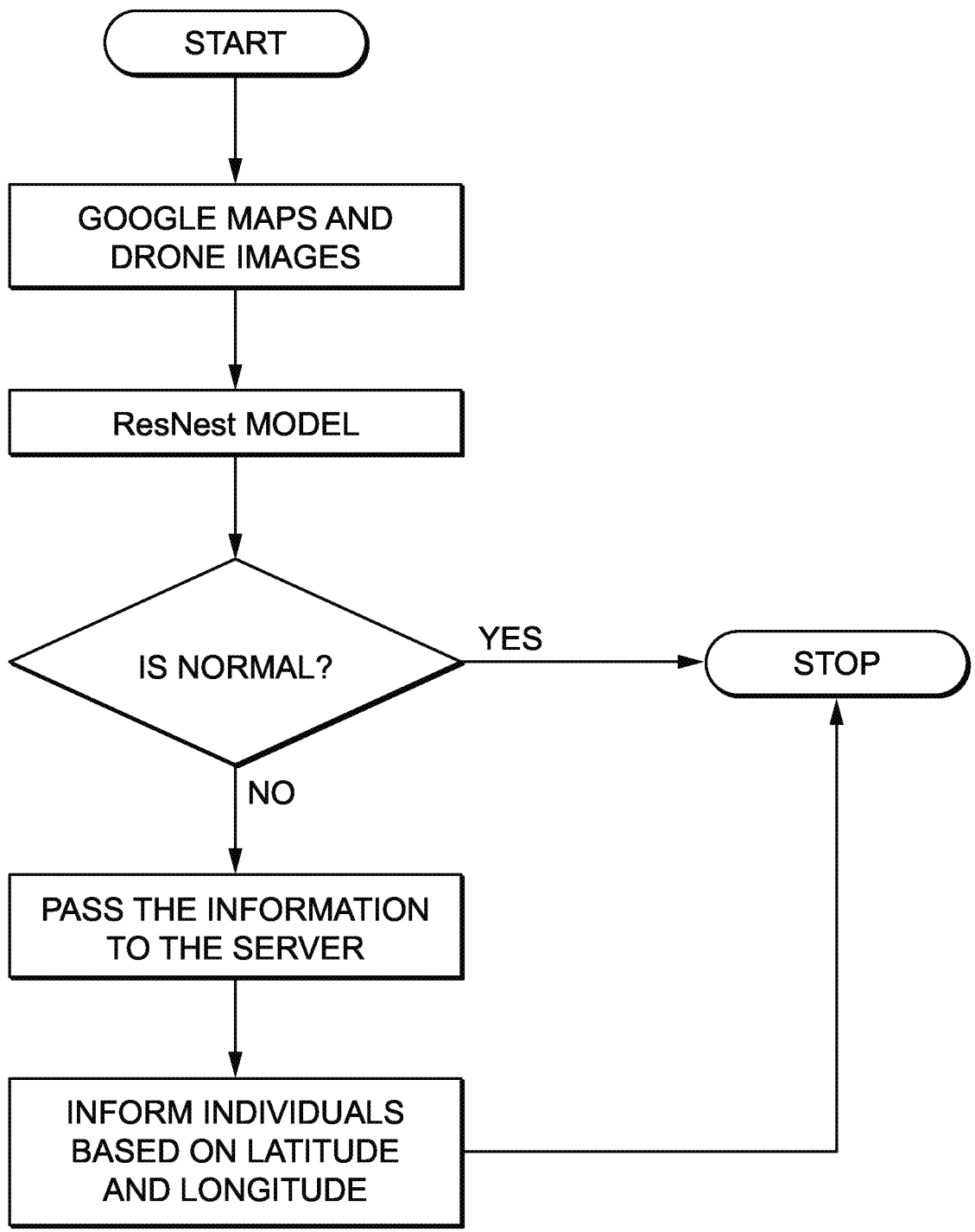
FIG. 9 is an illustration of a remote monitoring process.

Additionally, weather monitoring evaluates the local and regional climate for an agricultural area in remote locations. In order to detect potential hazards and devise countermeasures, it is necessary to conduct an assessment of the working environment. A feedback loop enables real-time monitoring and analysis of data from installed sensors, which triggers the control devices. FIG. 9 shows the proposed remote monitoring technique.

Figure 10:
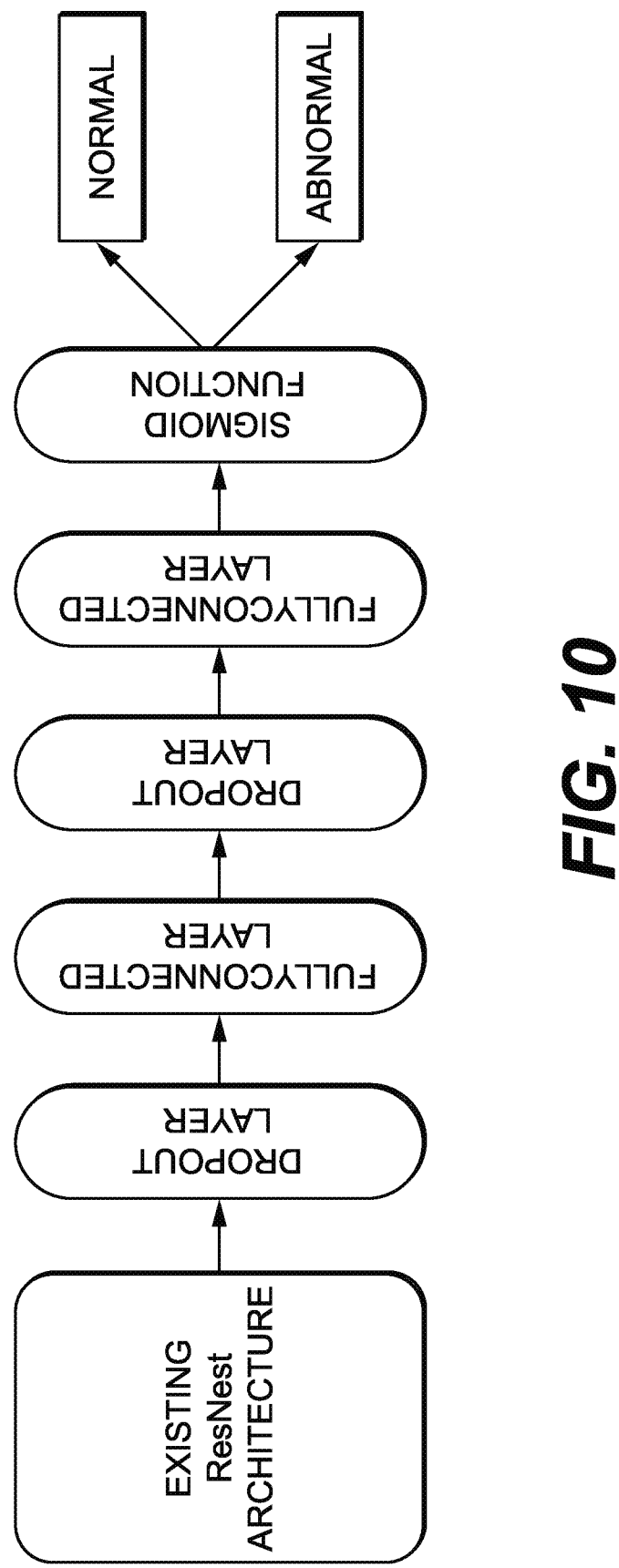
FIG. 10 is an illustration of a ResNest model trained with an additional five layers.

In this technique, we employ a ResNest model to identify the changes in the current environment using the images. The ResNest model is trained with an ImageNet dataset. We fine tuned the model and added an additional five layers, as shown in FIG. 10. In addition, we use this ResNest model for managing the crops.

5. Resource Management

Figure 11:
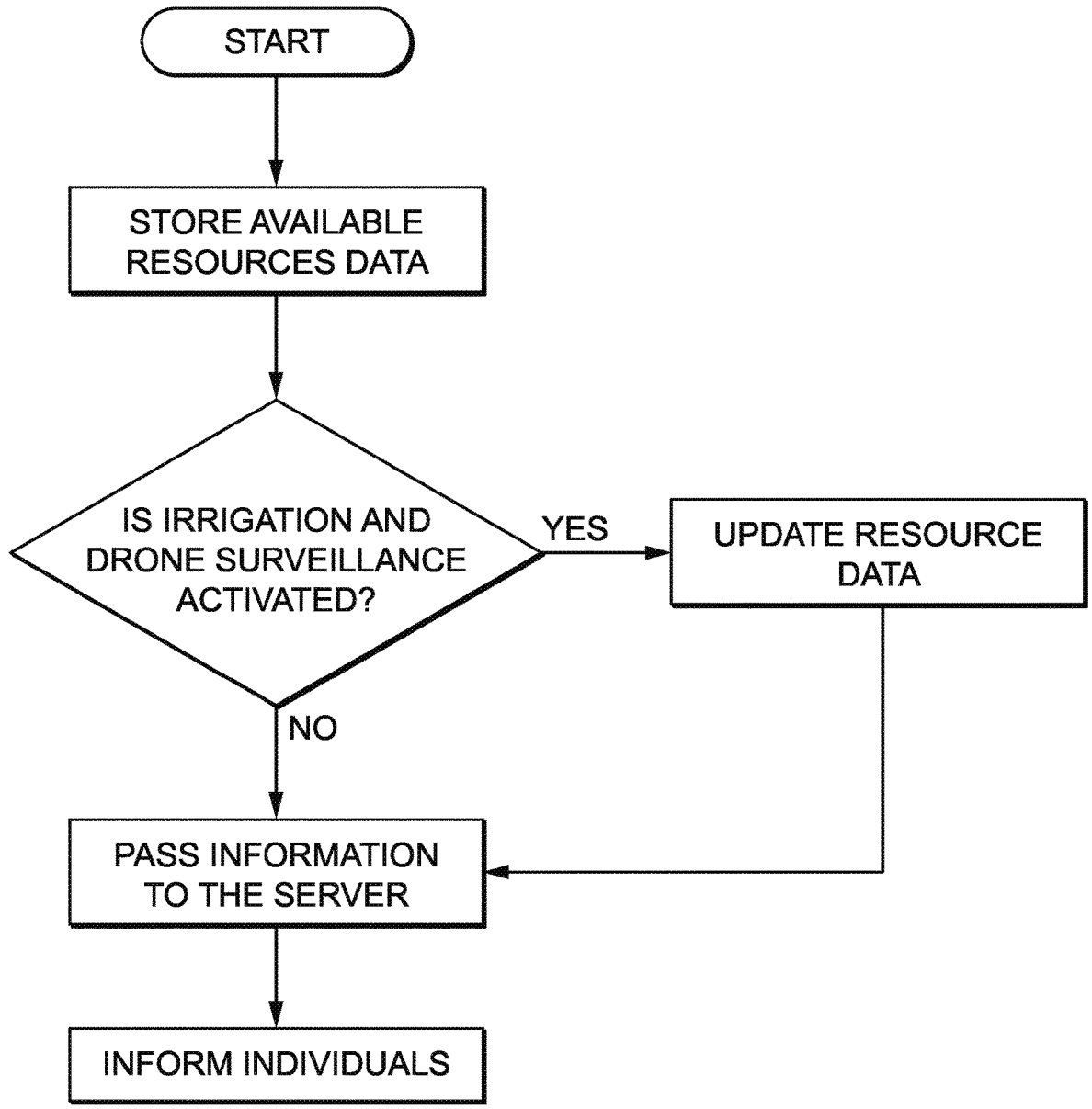
FIG. 11 is an illustration of the process for storing and updating available resource data on a server.

In this phase, we store the available data in Cloud storage. The routine activities are updated on the server, as shown in FIG. 11. The users will be updated about the available resources. Based on the information, the users can manage the resources efficiently. For instance, when a drone initiates the irrigation processes, the resources will be consumed for irrigation. Thus, the data will be updated frequently to avoid a resource shortage. The users can add their production data into the server in order to maintain their productivity.

6. Virtual Tours

Figure 12:
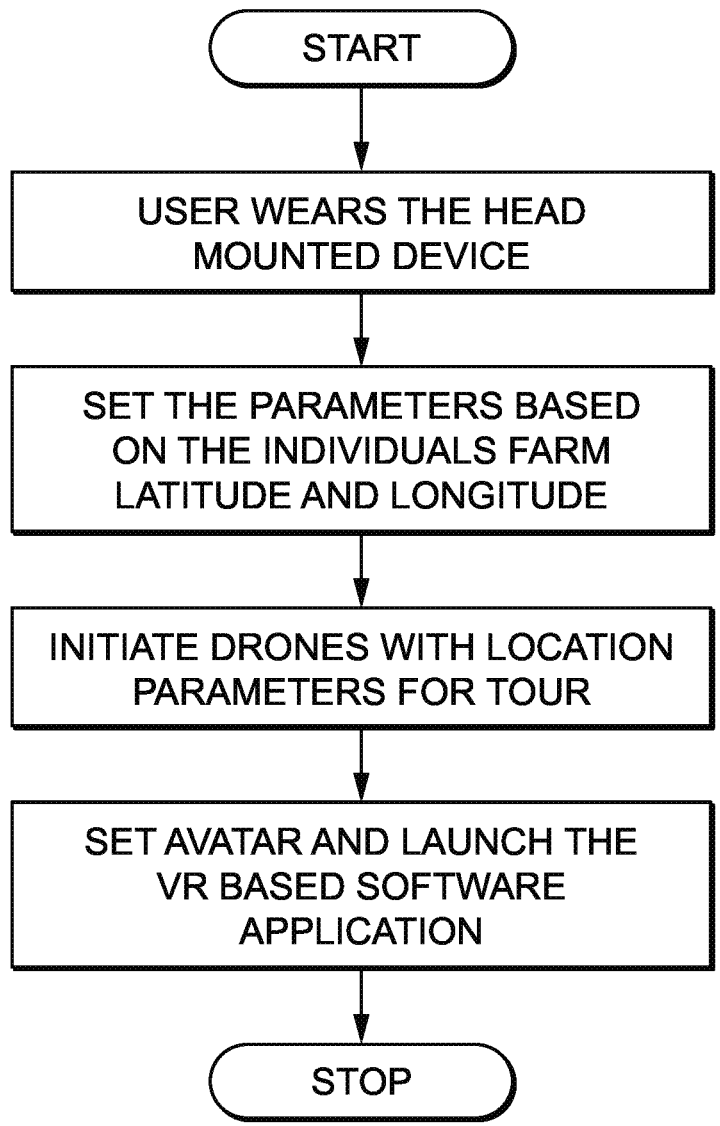
FIG. 12 is an illustration of a virtual tour process allowing users to feel the real-time environment of their farms.
Figure 13:
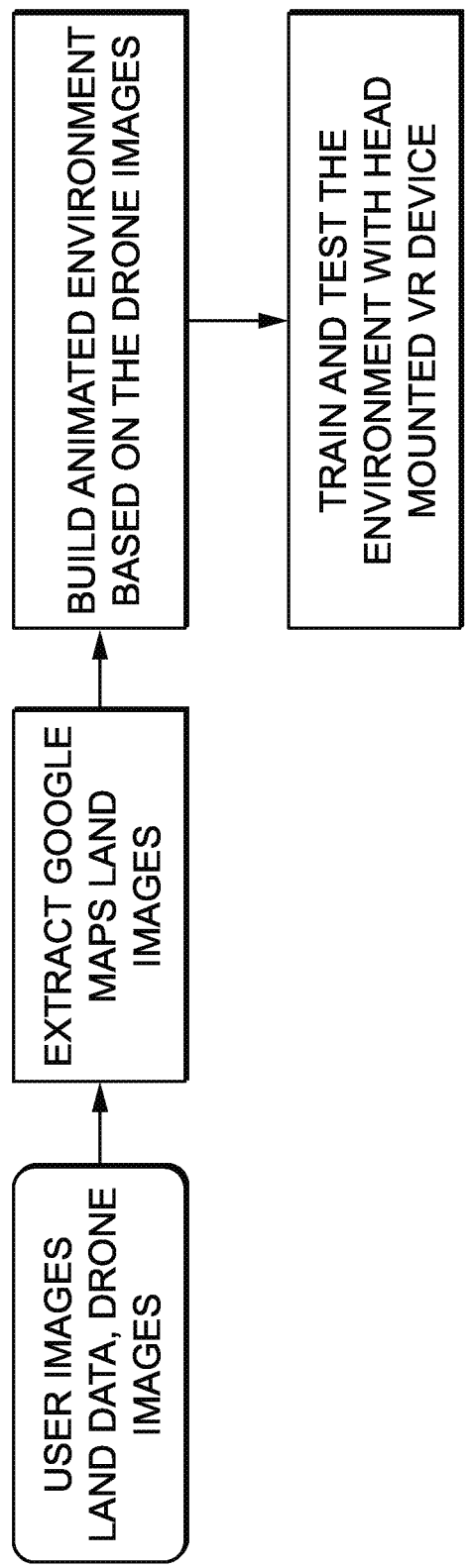
FIG. 13 is an illustration of a processes of developing a virtual reality application.

FIG. 12 outlines the proposed virtual tour that allows users to feel the real-time environment of their farms. Using a head-mounted device, the users can interact with the application to visit their places virtually. A drone will be launched and flown over the specific location. Using the fast-region GANs, the user can view the site in real time. In addition, FIG. 13 shows the processes of developing a virtual reality application. Both Google map images and Drone images are used for creating the animated location.

7. Crop Management

Figure 14:
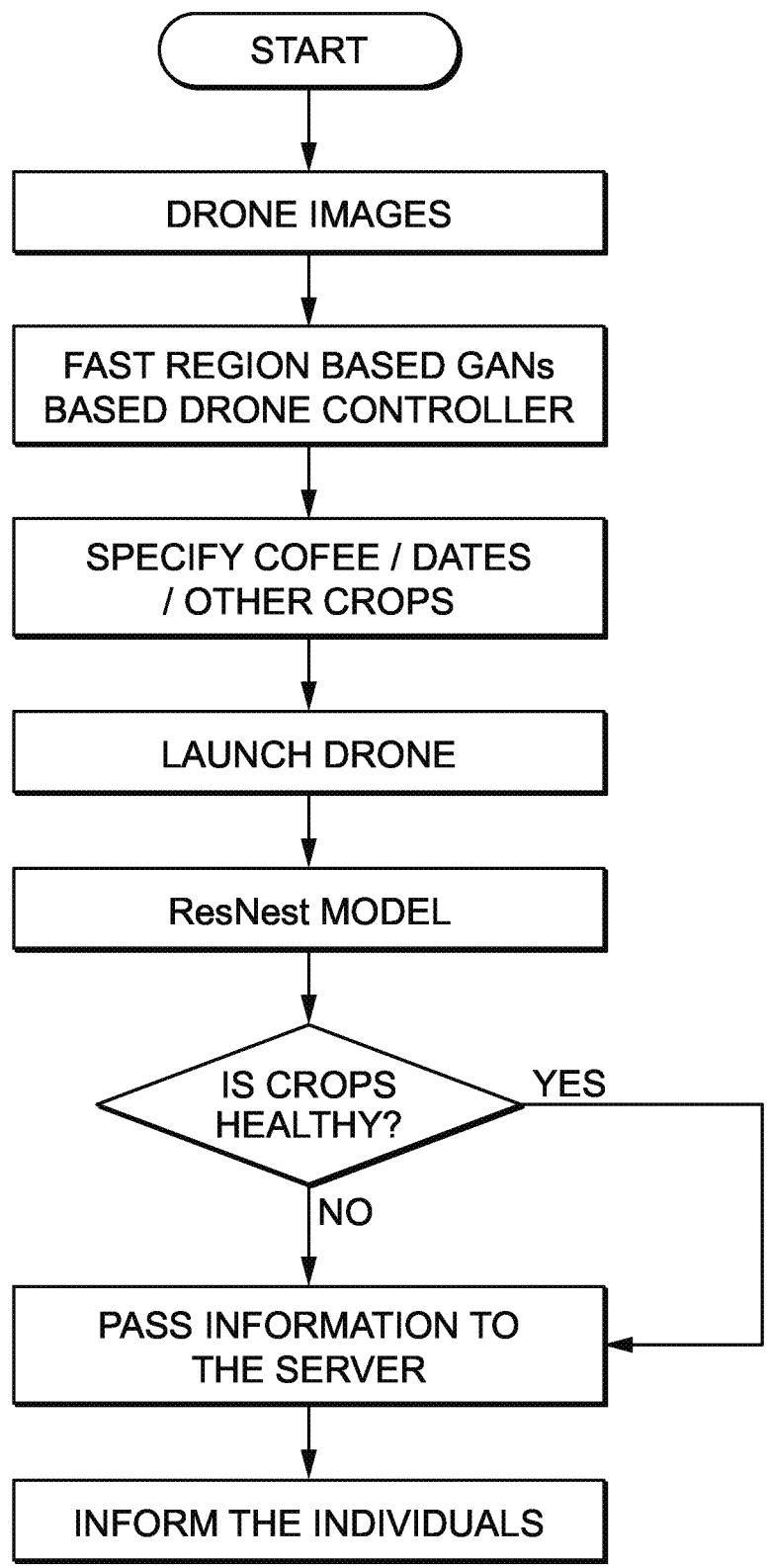
FIG. 14 is an illustration of a crop management process.

FIG. 14 highlights the crop management processes. Drones are controlled through the fast region GANs and ResNest model. The ResNest model identifies the normal and abnormal crops and passes the information to the server. Both fast-region GANs and ResNest models are explained in FIGS. 4 and 10, respectively.

Figure 15:
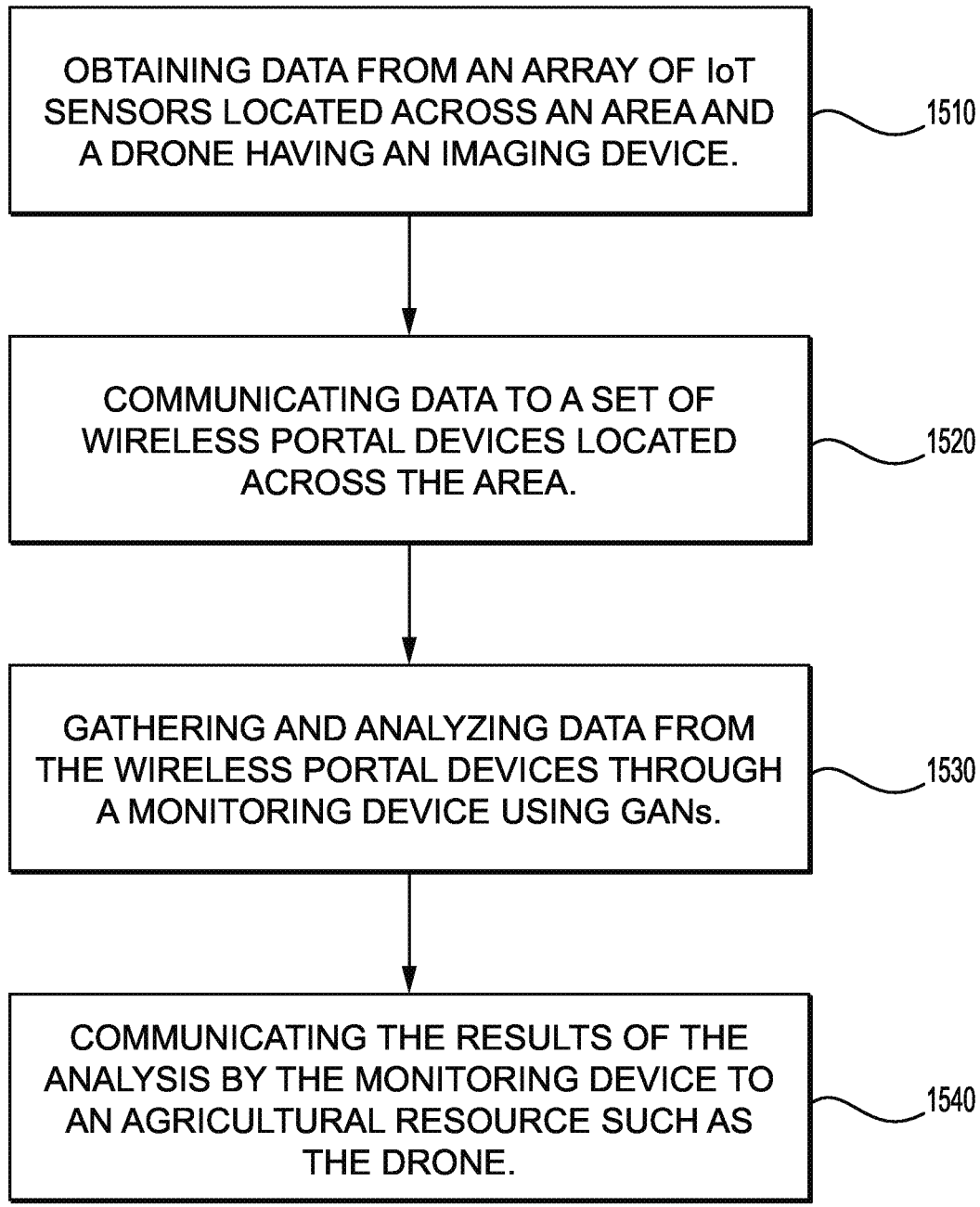
FIG. 15 is a flow diagram for a method of operating an agricultural managements system.

FIG. 15 is a flow diagram for a method of operating an agricultural managements system. In block 1510, data is obtained from an array of IoT sensors located across an area and a drone having an imaging device. The data is communicated, in block 1520, to a set of wireless portal devices located across the area. The data is gathered and analyzed, in block 1530, from the wireless portal devices by a monitoring device using GANs. The results of the analysis by the monitoring device are communicated, in block 1540, to an agricultural resource such as the drone.

The method further includes predicting outcomes of agricultural activities on the area and providing solutions to improve productivity through the monitoring device.

The method also includes identifying healthy and unhealthy crops through the monitoring device.

The method additionally includes spraying water and fertilizers with a sprayer located on the drone.

The method also provides a virtual tour of the area to a user through a head mounted device in communication with the monitoring device and the camera on the drone.

The method additionally includes turning on or off irrigation to the area through a controller based on the results of the analysis by the monitoring device.

It is to be understood that a system and method of agricultural management is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for operating an agricultural managements system, the method comprising:
   obtaining data from an array of Internet of Things (IoT) sensors of the agricultural managements system located across an area and at least one drone of the agricultural managements system having an imaging device and the at least one drone operating across the area;
   communicating the data to a set of wireless portal devices of the agricultural managements system located across the area;
   pre-processing images from the imaging device of the agricultural managements system using median and Laplacian filters;
   annotating each of the images with location data;
   analyzing the data from the wireless portal devices of the agricultural managements system using generative adversarial networks (GANS);
   extracting features from the images with liquid neural networks;
   generating feature maps from the extracted features;
   forwarding the feature maps to generator and discriminator units of the agricultural managements system of the GANs;
   storing the images in a training repository of the agricultural managements system for artificial intelligence-based image processing;
   communicating results of the analysis of the data to an agricultural resource of the agricultural managements system; and
   providing an operating instruction to said agricultural resource of said agricultural managements system based upon the communicated results of the analyzed data.

2. The method as recited in claim 1, further comprising predicting outcomes of agricultural activities on the area and providing solutions to improve productivity.

3. The method as recited in claim 1, further comprising identifying healthy and unhealthy crops.

4. The method as recited in claim 1, further comprising spraying water and fertilizers with a sprayer located on the at least one drone.

5. The method as recited in claim 1, further comprising providing a virtual tour of the area to a user through a head mounted device in communication with the imaging device on the at least one drone.

6. The method as recited in claim 1, further comprising turning on or off irrigation to the area through a controller based on the results of the analysis of the data.

* * * * *